(12) United States Patent
De Filippis et al.

(10) Patent No.: US 7,250,733 B2
(45) Date of Patent: Jul. 31, 2007

(54) CIRCUIT ARRANGEMENT AND METHOD FOR CONTROLLING A BRUSHLESS, PERMANENTLY EXCITED DIRECT CURRENT MOTOR

(75) Inventors: Pietro De Filippis, Milan (IT); Karsten Lohse, Würzburg (DE); Johannes Schwarzkopf, Marktheidenfeld (DE); Eberhard Wünsch, Waldbrunn (DE)

(73) Assignee: Siemems AG, München (DE)

( * ) Notice: Subject to any disclaimer, the term of this patent is extended or adjusted under 35 U.S.C. 154(b) by 0 days.

(21) Appl. No.: 10/551,555

(22) PCT Filed: Jan. 19, 2004

(86) PCT No.: PCT/EP2004/000353

§ 371 (c)(1),
(2), (4) Date: Jun. 19, 2006

(87) PCT Pub. No.: WO2004/091088

PCT Pub. Date: Oct. 21, 2004

(65) Prior Publication Data

US 2007/0040520 A1    Feb. 22, 2007

(30) Foreign Application Priority Data

Apr. 10, 2003 (DE) ................. 103 16 539

(51) Int. Cl.
*H02P 7/06* (2006.01)
(52) U.S. Cl. .................. 318/254; 318/439; 318/801; 318/805
(58) Field of Classification Search ........... 318/138, 318/245, 254, 439, 801, 805
See application file for complete search history.

(56) References Cited

U.S. PATENT DOCUMENTS

| | | | |
|---|---|---|---|
| 4,939,633 A * | 7/1990 | Rhodes et al. | 363/98 |
| 5,457,374 A * | 10/1995 | Branecky et al. | 318/801 |
| 5,469,033 A | 11/1995 | Huang | |
| 5,608,300 A * | 3/1997 | Kawabata et al. | 318/721 |

(Continued)

FOREIGN PATENT DOCUMENTS

DE    43 39 195 A1    5/1994

(Continued)

OTHER PUBLICATIONS

Abstract of JP 08317685 A ; Japan vol. 1997, No. 03, Mar. 31, 1997;Matsushita Denki Sangyo K.K, Japan.

(Continued)

*Primary Examiner*—Paul Ip

(57) ABSTRACT

The invention relates to a circuit arrangement for self-commuting control of a brushless, permanently excited direct current motor. Said circuit arrangement determines the commutation interval by evaluating the induction signal of a signal phase. A capacitive interference suppression component is arranged between the signal phase and an adjacent motor phase in the commutation cycle in order to suppress interferences of the induction signal. The capacitive interference suppression component is dimensioned in such a way that interfering influences of the power-switch element upon the induction signal are compensated for. This makes it possible to more accurately determine the momentary rotating position of the rotor and, hence, a differentiated control or adjustment of performance-influencing manipulated variables during operation. This has positive effects upon the efficiency, the power/weight ration and energy consumption of the motor and enables stable operation.

16 Claims, 9 Drawing Sheets

U.S. PATENT DOCUMENTS

| | | | |
|---|---|---|---|
| 5,874,818 A * | 2/1999 | Schuurman | 318/439 |
| 5,923,728 A * | 7/1999 | Ikkai et al. | 318/807 |
| 6,020,715 A | 2/2000 | Yasohara et al. | |
| 6,236,179 B1 * | 5/2001 | Lawler et al. | 318/439 |
| 2002/0181137 A1 * | 12/2002 | Kimura et al. | 360/73.03 |
| 2005/0036228 A1 * | 2/2005 | Kimura et al. | 360/73.03 |
| 2005/0281067 A1 * | 12/2005 | Deng et al. | 363/131 |
| 2006/0044664 A1 * | 3/2006 | Itagaki et al. | 360/73.03 |

FOREIGN PATENT DOCUMENTS

| | | |
|---|---|---|
| EP | A-0 070 341 | 5/1998 |
| JP | 08317685 A | 3/1997 |

OTHER PUBLICATIONS

Abstract of EP-No. 0070341; Compagnie Industrielle des Telecommunications CIT-Alcatel S.A., F-75008 Paris (Franc).

Derwent-Abstract of DE-PS No. 43 39 195A1; Matsushita Electric Industrial Co. Ltd, JP-Osaka (Japan).

* cited by examiner

Half-wave differential amplifier unit with filter function

CIRCUIT ARRANGEMENT AND METHOD FOR CONTROLLING A BRUSHLESS, PERMANENTLY EXCITED DIRECT CURRENT MOTOR

BACKGROUND OF THE INVENTION

The invention relates to an electronic circuit arrangement and a method for self-commutating control of a brushless, permanently excited, direct current motor, the rotor position being determined without additional sensors.

When an electronically commutated electric motor is to be operated as a self-commutating machine, the momentary rotor position has to be detected. Separate sensors such as encoders, resolvers or Hall ICs can be used for this purpose. However, it is also possible to use a sensor-free system which detects the rotor position by evaluating the voltages induced in the motor phases.

U.S. Pat. No. 5,469,033 A discloses a method by which the arrangement of a plurality of Hall sensors in a brushless direct current electric motor is replaced by an electronic circuit arrangement. Signals which this circuit arrangement generates with the aid of a logic unit replace the functions of the Hall sensor signals.

However, limits are imposed on the exact positioning of the Hall sensors, more especially in the case of smaller drives. The mechanical outlay rises significantly. In order to keep the positioning error margin low and obtain a high degree of efficiency and/or high motor torque, the only option open is often to adjust the sensors at considerable expense during the manufacturing process. The result is a considerable increase in costs, particularly for those motors which are very small but nonetheless expected to meet very high performance standards. For such cases the sensor-free system for rotor position detection is an economical alternative despite the higher outlay in electronics. Also in the case of motors in which the rotor is encapsulated, so that additional mechanical outlay is needed in order to pass the Hall sensor signals through the housing, it can be advantageous to use a sensor-free system which detects the rotor position by evaluating the voltages induced in the motor phases. Sensor-free systems for rotor position detection have become an established feature of lower-powered motors which are not subject to exacting requirements with regard to dynamics, and of motors intended to operate within a limited range of speeds. Examples include hard disk drives, pump drives, fans and forced induction engines. This method is based on the detection and evaluation of the electrical signals induced in the phases. Such signals are also known as counter emf signals or back emf signals, and are referred to from here on simply as induction signals.

European patent application EP 0 840 439 A1 discloses an amplifier and a method for determining an induction signal (back emf signal) in a phase of a direct current motor in order to determine the rotor position. In this instance a comparator circuit is used to compare the induction signal with a reference signal. If the reference signal is exceeded the status of the output signal is altered. In order to eliminate unknown factors arising from component-related response hysteresis, a voltage offset is superimposed on both the induction signal and the reference signal, the voltage offset being applied to the reference signal in response to a control signal only when the induction signal approaches a zero passage.

In the known method, evaluation of the induction signal to determine the rotor position assumes that the induction signal has an ideal curve, but this does not correspond to an induction signal that is actually measurable in a motor phase during normal running. In reality such a signal is overlaid with interference and oscillations, caused for example by the electronics. This occurs in particular when the motor is operated in pulse-width modulation mode and is connected to power semiconductors for the purpose of commutation. The signal is therefore overlaid with interference having a bandwidth of unknown frequency and amplitude, complicating the accurate determination of the induction signal curve and thus of the relative rotor position. This in turn, particularly at higher rotational speeds, has the effect of causing appreciable power restrictions during normal running and further restrictions during speed adjustment and control.

SUMMARY OF THE INVENTION

The object of the invention is to define more accurately the relative, momentary rotating position of the rotor in a brushless, direct current motor, thus enabling differentiated control of manipulated variables which play a decisive role in determining power and efficiency during self-commuting operation of the motor.

This object is inventively achieved by a circuit arrangement referred to in claim 1 and a method having the features which will emerge from claim 7.

The inventive circuit arrangement can be used in star, delta or polygon configuration regardless of the number and wiring of the motor phases. In principle each of these phase-wiring configurations gives rise, per phase, to a free, external phase connection which can be switched via power-switch elements to the higher or lower potential of a direct current supply source, according to choice, and can also be separated from both potentials and thus be virtually potential-free when switched.

The power control unit for switching the individual motor phases to the three switching states mentioned above consists of power-switch elements. For this, at least two of these power-switch elements are provided per phase, using half bridges. These power-switch elements are controlled by the control unit in such a way that each motor phase is connected for the purpose of commutation, that is, in cyclic sequence and offset in time from the remaining motor phases for one duration in each case, alternating between first the higher potential (switching state 1), then potential-free (switching state 2) and then the lower potential (switching state 3) of the DC voltage source. This sequence of switching states is known as the commutation cycle of a phase, and is continuously repeated. This action generates in the stator or the rotor, depending on the construction principle of the motor, a rotating magnetic field which the permanently excited rotor or stator follows synchronously and rotates.

The duration of a part cycle or of a switching state in the commutation cycle of a phase, in which a battery potential is applied to the phase, is from here on also referred to as a commutation interval or commutation angle.

At the same time the rotation of the rotor generates in the phase an electrical induction signal that in its idealized form has for the most part a sinusoidal curve. A single pass of this sine curve from 0° to 360° typifies the electrical cycle of a motor phase. When the rotating magnetic field and the rotor are running synchronously, a complete commutation cycle corresponds to one phase in the electrical cycle and thus to an angle of 360°.

Relative to the complete commutation cycle of a phase, an angular section known as the commutation angle can also be assigned to the commutation interval.

The commutation interval, which determines not only the time ratio of the potential-free cycle section to the cycle sections in which a battery potential is applied to the phase, but also the respective switching instant relative to the rotor position, affects both the rotational speed and torque of the motor.

A further way of influencing the power of a motor consists of a control method known as pulse-width modulation mode, which from here on will be referred to as PWM control. PWM control means that the switching states which are not potential-free (switching states 1 and 3) are not continuously maintained during the complete commutation interval, but instead the respective battery potential is switched on and off in a variable pulse-width ratio. This pulse-width ratio defines the time ratio of the on and off periods and determines the average power, thereby defining the motor speed and torque.

Since the respective instant of switching from one switching state to the next is defined as a function of the rotor position, it is important to know the current rotor position as accurately as possible. The electrical induction signal induced in the phase by the rotation of the rotor is used to determine the rotor position. The only range of the electrical commutation cycle which can be considered for this purpose, however, is that in which the respective phase is potential-free when switched (switching state 2), since in this case there are no battery voltages or currents overlaying the induction signal. This range is narrower with increasing commutation angles and shorter in duration with increasing rotor speed. In order for it to be possible to evaluate the induction signal curve with the necessary accuracy in these circumstances, the said signal has to be as free from interference as possible.

Due to their design, however, the power-switch elements have electrical capacitances that give rise to spurious effects. These capacitances interfere with the induction signal by imposing a load on the phase that needs to be measured, and causing current and voltage fluctuations which overlay the induction signal. Due both to environmental influences and to the design of the motor and control circuit, the induction signal is naturally for the most part already overlaid with high-frequency interference in any case. Such an unclean, interference laden induction signal cannot provide an accurate determination of the rotor position without additional signal generators.

Due to the invention it is now possible in large part to compensate successfully for the said interference in the induction signal. The invention is based on the finding that the circuit layout arising from the phase arrangement and the power-switch elements, relative to only one phase in each case, can be provided in the form of a bridge circuit from which just one element is missing in each case.

Thus according to the invention only one phase can be used to measure the necessary induction signal. This will be referred to from now on as the signal phase. A capacitive interference suppression component, such as a R/C element, is arranged between the signal phase connection and the phase connection of an adjacent phase in the commutation cycle, completing the bridge circuit relating to the signal phase.

The bridge circuit therefore consists of the following:
the two adjacent phases of the signal phase in the commutation cycle, which form one arm of the bridge circuit,
the spurious total capacitance of the power-switch elements assigned to the signal phase, and the capacitive interference suppression component, which together form a second arm of the bridge circuit, and
the signal phase itself, which forms the measuring bridge on which the induction signal is to be measured.

The capacitive interference suppression component is dimensioned in such a way that the said bridge circuit is balanced so that interfering influences of the power-switch element upon the induction signal are compensated for. The induction signal is thus cleared of these interfering influences and can be measured at the phase connection.

The said induction signal is then fed to a separate set of evaluation electronics or to an evaluation logic unit integrated in the main control unit, where the current position of the rotor is determined from the signal curve.

By this means the invention enables interference resistant running and increased efficiency, especially in threshold regions as well as in the case of high speed, wide commutation angles and a varying pulse-width ratio. This has positive effects upon the power/weight ratio and the motor size as well as upon the energy consumption when operating. Further embodiments of the invention are characterized in the sub-claims.

BRIEF DESCRIPTION OF THE SEVERAL VIEWS OF THE DRAWINGS

A typical embodiment of the invention will be explained below in greater detail with the aid of the attached diagrams. These show the following.

DETAILED DESCRIPTION OF THE INVENTION

Figure 1:
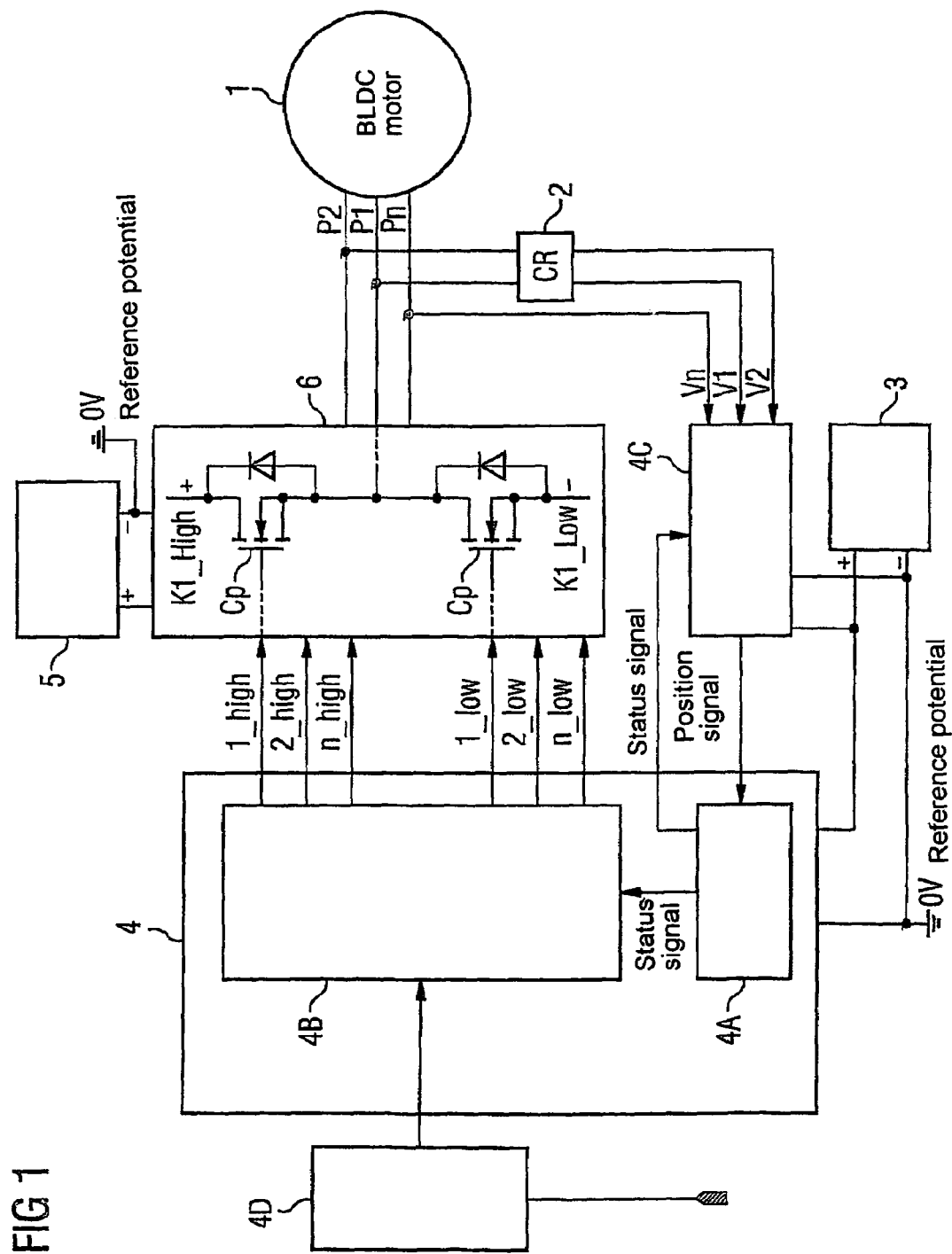
FIG. 1 A block diagram of the circuit arrangement for controlling a brushless direct current motor, FIG. 2 A curve showing a phase signal over an electrical phase cycle, FIG. 3 A bridge circuit constructed from three motor phases, power-switch elements and an interference suppression component, FIG. 4 A circuit arrangement of a half-wave differential amplifier unit with filter function, FIG. 5 A typical embodiment of a gate generator, FIG. 6 The circuit layout of a signal generator for generating an open-window control signal, FIG. 7A A typical embodiment of a position detector with digital filter function for generating a position signal, FIG. 7B Excerpts from diagrams plotting over time the signal curves which are used for generating said position signal, FIG. 8 A threshold generator for generating and activating a threshold signal, FIGS. 9a to 9c Idealized time-related curves of the signals used or generated for determining the rotor position at different rotor speeds, and FIG. 10 A main circuit arrangement for controlling a brushless motor, in which the main control unit processes the induction signal and generates a position signal.

Elements and signals which have the same functions are given the same reference characters or names in the figures.

FIG. 1 is a block diagram showing the main layout of the control electronics for a brushless electric motor. The main units shown are an electric motor 1, a power control unit 6, a capacitive interference suppression component 2 (CR), a signal conditioning unit 4C, a main control unit 4 with a position processing module 4A and a commutation module 4B, a pulse width generator 4D, a power DC voltage source 5 and a control DC voltage source 3.

The electric motor 1 is shown in the form of a brushless direct current motor having three motor phases, and will also be referred to below as a BLDC motor. The power control unit 6 includes a diagram of the arrangement of power-switch elements K1_High, K1_Low in the form of a transistor half-bridge circuit for controlling a motor phase P1, being representative of the power-switch elements on the further motor phases P2 to Pn, the number of phases n of the electric motor being basically a matter of choice.

For the purpose of commutation the motor phases P1 to Pn of the electric motor 1 are connected by the power control unit 6 to the potentials of the power DC voltage source 5. The power-switch elements in the power control unit 6 are controlled by the commutation module 4B in the main control unit 4. In addition, signal lines V1 to Vn are connected to the motor phases P1 to Pn of the electric motor 1, and the phase signals from the motor phases P1 to Pn are fed to the signal processing unit 4C.

The signal conditioning unit 4C generates the position signal, which is fed to the main control unit 4 where it is further processed in the position processing module 4A.

Between the motor phase P1, also referred to below as signal phase P1, and the adjacent motor phase P2 is the capacitive interference suppression component 2 (CR), which compensates for interfering influences on the induction signal from the signal phase P1.

The signal processing unit 4C and the main control unit 4 receive their current via the component known as the control DC voltage source 3. As an alternative to the control DC voltage source 3, a supply voltage can be tapped from the power DC voltage source 5. This supply voltage can be adapted at the level of the working voltage of the main control unit 4 and of the signal processing unit 4C with the aid of a voltage regulator 7 or a voltage converter 7.

In the signal conditioning unit 4C, a rotor position signal is generated from the induction signal of the signal phase P1 as a function of status signals from the main control unit 4, and said rotor position signal is fed to the position processing module 4A in the main control unit 4. From this information the position processing module 4A in the main control unit 4 generates status signals equating to the corresponding rotor position section. These status signals are fed to both the signal conditioning unit 4C and the commutation module 4B in order to adjust the motor power.

As a function of the status signals and the signals from the pulse width generator 4D, the commutation module 4B emits the control signals 1_hi to n_low for the power-switch elements. These control signals are correspondingly modulated on the PWM signal, thereby varying the actual motor power.

The control signals 1_hi to n_low are conditioned as necessary in the power control unit 6, thus controlling the power-switch elements.

Figure 2:
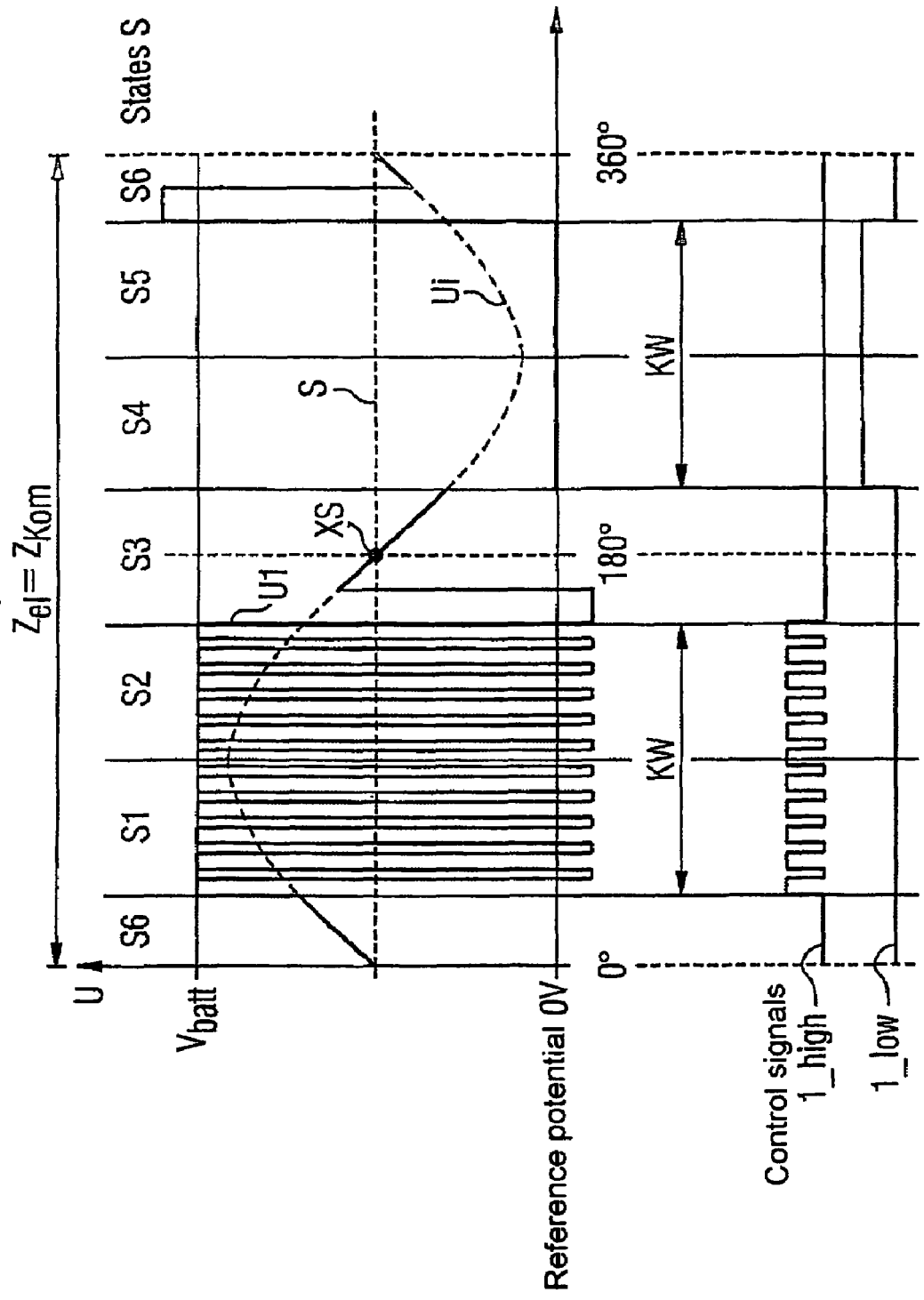

FIG. 2 shows in the upper phase diagram an idealized, time-related curve of a phase signal U1 on the signal phase P1 of the electric motor during pulse-width modulated control. An idealized sinusoidal curve of the induction signal Ui and the associated sine axis S are displayed behind the phase signal. The complete electrical cycle $Z_{el}$ is divided into six individual sections of equal length S1 to S6, referred to below as "states", being 60° in each case.

Below these the associated control signals 1_high and 1_low for the associated power-switch elements of the signal phase are displayed.

Due to the rotation of the rotor relative to the stator, the winding belonging to a phase passes through the magnetic fields from the corresponding magnetic poles.

In the case of a phase connection which is potential-free when switched, a largely sinusoidal curve of the induction signal Ui develops around a sine axis S in the corresponding phase on passing through a corresponding idealized magnetic field. A single pass of this sine curve from 0° to 360° corresponds to the electrical cycle $Z_{el}$ of the phase concerned. Depending on the number of magnetic poles in the motor, the electrical cycle $Z_{el}$ in a phase is passed through many times during one revolution of the rotor.

The commutating, pulse-width modulated connection of the signal phase to the battery potential $V_{batt}$ is superimposed on this sinusoidal curve of the induction signal Ui, which requires synchronism of the rotor and the rotating magnetic field. When the rotor and the rotating magnetic field are running synchronously, the electrical cycle $Z_{el}$ equates to the commutation cycle $Z_{Kom}$.

As the rotor speed increases the electrical cycles of a phase are passed through in ever shorter lengths of time. For the same reason the main control unit must also repeat the commutation cycle more quickly.

As a result the main control unit, which may be for example a microcontroller, is subjected to heavy demands with regard to controlling the individual motor phases. In order to keep these demands within manageable bounds, the commutation cycle $Z_{Kom}$ is divided into a predetermined number of states, usually of the same size. For the duration of at least one state the connection of the individual motor phases is maintained in each case. In order to keep the illustration simple, the electrical cycle in FIG. 2 has been divided into six states S1 to S6, of 60° each, but more or fewer divisions are certainly possible.

The voltage potentials (0V/$V_{batt}$) of a DC voltage source that are applied within certain states (states S1 and S2 as well as S4 and S5) are superimposed on the sinusoidal curve of the induction signal Ui in the electrical cycle $Z_{el}$. The length of time for which a phase is switched to a potential of the DC voltage source is known as the commutation angle KW. If, as shown in FIG. 2, a potential of the DC voltage source is switched to a motor phase for two consecutive states of 60°, this results in a commutation angle KW of 120°.

The upper potential $V_{batt}$ of the DC voltage source applied to the phase connection for the duration of one or more consecutive states is shown in FIG. 2 as being pulse-width modulated. That is, this potential is switched on and off at a particular frequency within the commutation angle KW under the control of the control signal 1_high. The ratio of the on and off periods influences the power delivered by the electric motor.

An overshoot in the phase signal U1, consisting of the induction signal Ui and the respective potential of the DC voltage source (0V/$V_{batt}$) switched to the phase, during every cut-off procedure below the 0V potential, is due to the inductive behavior of the phase windings.

During state S3 the signal phase P1 is separated from both potentials of the DC voltage source. In this state the isolated induction signal Ui can be seen, as no battery potential is superimposed on it. This region also contains point XS, where the quasi-sinusoidal induction signal Ui intersects with the sine axis S, also known as the zero passage of the sine curve. This point corresponds to an assigned rotor position relative to the stator within an electrical cycle of the signal phase P1.

However, here too it should be observed that after the battery potential $V_{batt}$ has been switched off an induction-related overshoot of the phase signal U1 below the 0V level will be apparent. Because of this the sine axis S of the phase signal U1 is first overshot in the direction of the 0V level and then again in the opposite direction before the induction signal Ui and its quasi-sinusoidal curve can be seen. This overshoot region must be masked when determining the rotor position.

Figure 3:
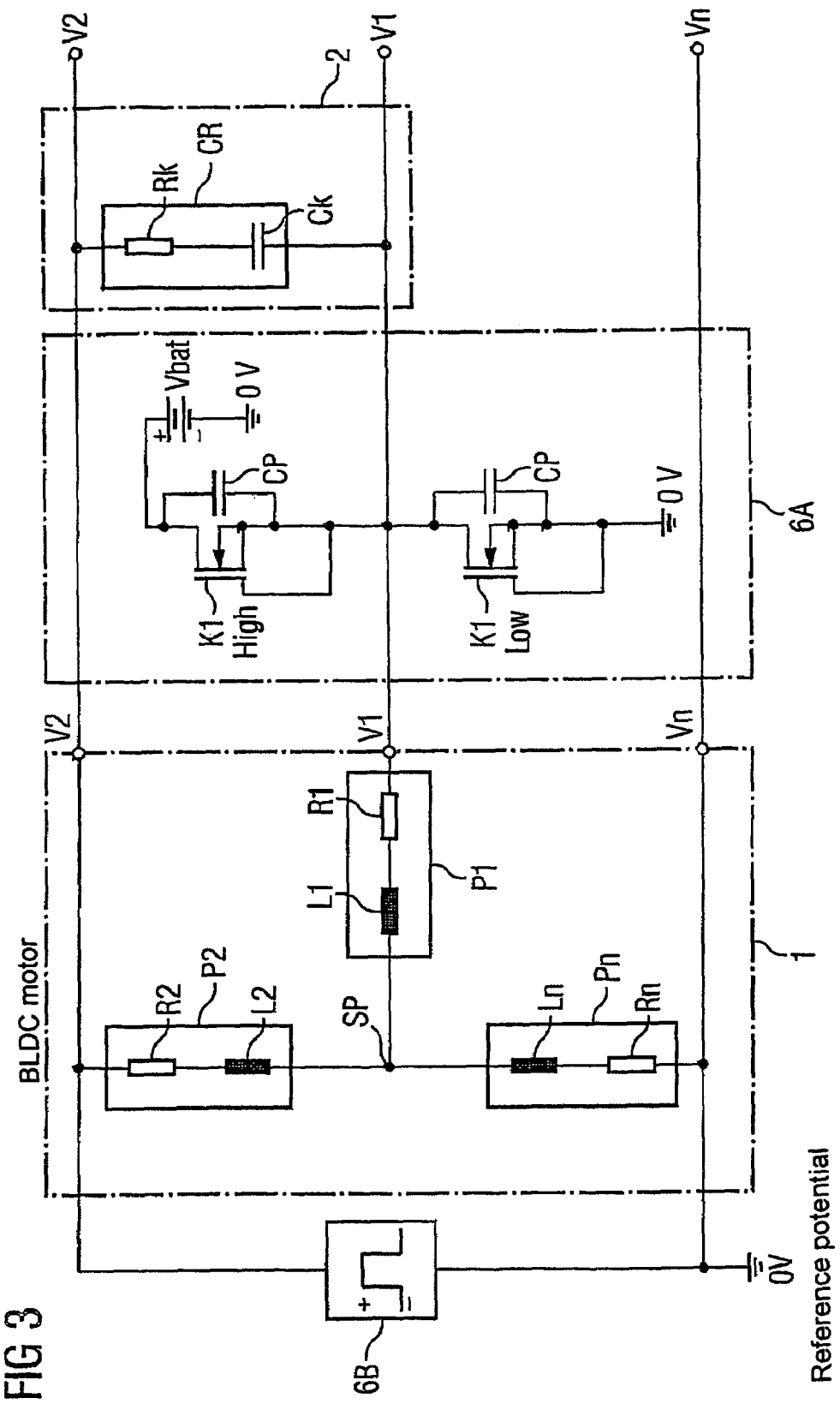

The circuit diagram in FIG. 3 shows an arrangement of motor phases P1, P2, Pn of a BLDC motor 1, a pulse source 6B on the phase connections V2 and Vn, a physically represented arrangement of the power-switch elements (K1_High and K1_Low) 6A on the phase connection V1 of a signal phase P1, and the arrangement of the capacitive interference suppression component 2 (CR) between the phase connections V1 and V2 of the motor phases P1 or P2. The interference suppression component 2 consists of a resistor Rk and a capacitor Ck, connected in series.

The BLDC motor 1 is shown here as a three-phase motor. The pulse source 6B is a simplified representation of the half-bridge arrangements of power-switch elements for the motor phases P2 and Pn, and can be assumed to be oscillating with a PWM frequency.

In dynamic procedures the effect of the spurious MOSFET capacitances Cp of the power-switch elements K1-High and K1-Low of the phase P1 is such that they can be assumed to be wired parallel to ground. With the aid of the capacitive interference suppression component 2 (CR), the bridge circuit, consisting of motor phase P2, motor phase Pn, 2×Cp and the signal phase P1 that is to be measured, can now be balanced in such a way that the small-signal potential difference between a neutral point SP and the phase connection V1 is zero.

Ideally the capacitance value Ck of the capacitive interference suppression component 2 (CR) corresponds to the total capacitance of the associated spurious MOSFET capacitances Cp. In this case the capacitance value Ck is given by Ck=2×Cp.

The resistor Rk then serves to limit the compensation current through the interference suppression component 2.

Figure 4:
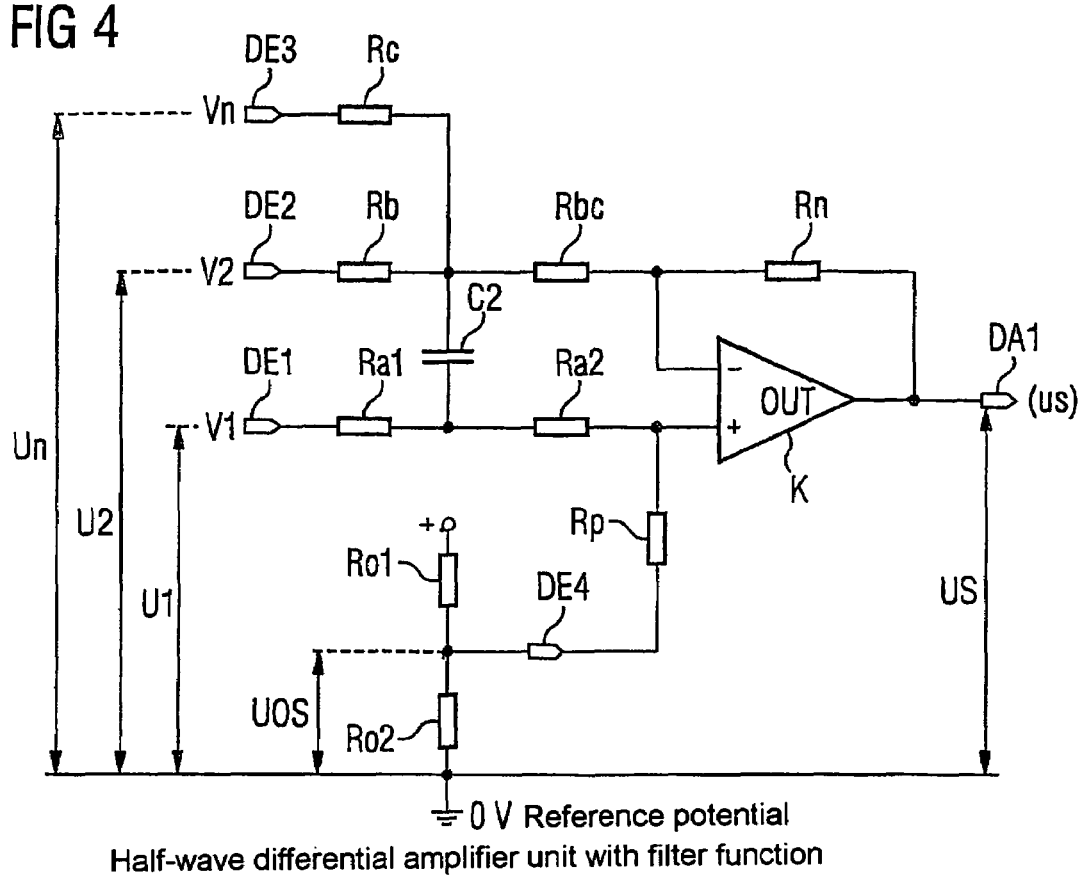

FIG. 4 shows the circuit layout of a half-wave differential amplifier unit, also known as a HDV unit, with additional filter function for a three-phase BLDC motor. The HDV unit has three signal inputs DE1, DE2 and DE3 for the phase connections V1, V2 and Vn of the motor phases P1, P2 and Pn, together with a further signal input DE4 for an offset signal uos. The HDV unit further has a comparator component K and a capacitor C2 as well as miscellaneous resistors Rx. An evaluation signal us is provided at the signal output DA1.

In the HDV unit, which may be a component of the signal conditioning unit 4C, the phase signals U1, U2 or Un of the signal phase P1 or of the motor phases P2 and Pn which are adjacent in the commutation cycle, are fed in via the signal inputs DE1, DE2 and DE3. A constant offset signal uos is fed in via the further signal input DE4. The offset signal uos serves to create a link to a reference potential and can be provided by a simple voltage divider, consisting of Ro1 and Ro2, at a DC voltage source (not shown), the 0V potential of which forms the 0V reference potential.

The three phase signals U1, U2 and Un are interlinked via the resistors and the comparator component K by the relationship $$us = \frac{2}{3} \cdot U1 - \frac{1}{3} \cdot (U2 + Un)$$

and referenced to the 0V reference potential of a DC voltage source. As a result a voltage US, referenced to the 0V reference potential of the DC voltage source referred to below as the evaluation signal us, is present on the signal output DA1 of the HDV unit.

For this the ratio 1:3 is set in each case by means of the resistors Rn, Rb and Rbc as well as from Rn, Rc and Rbc according to the relationship $$\frac{Rn}{Rb + 2 \cdot Rbc} = \frac{Rn}{Rc + 2 \cdot Rbc} = \frac{1}{3}$$

and the ratio 2:3 is set by means of the resistors Ra1, Ra2, the internal resistor Ro of the offset-signal source, and Rp, according to the relationship $$\frac{Rp + Ro}{Ra1 + Ra2} = \frac{2}{3}$$

A capacitor C2 and the resistors Rb, Rc and Ra1 together form a filter for suppressing disturbing signals which are superimposed on the phase-signals and have not already been compensated for by an upstream interference suppression component (CR). In order to achieve a highly effective degree of interference suppression, this filter must be well decoupled from the circuit arrangement within which it is located. The arrangement Rbc>>Rb, Rc and Ra2>>Ra1 should therefore be chosen. An overall gain factor of one ensures an optimum signal-to-noise ratio.

By an analysis of nodes and networks it can be shown that the evaluation signal us on the signal output DA1 of the HDV unit is proportional to the phase signal U1 of the signal phase P1. A condition for this is that the phase inductance is independent of angle and that current is no longer flowing from the half-bridge of the phase P1 to the corresponding phase connection V1. At an overall gain factor of one, the evaluation signal us on the signal output DA1 is equal to the phase signal U1 on the signal phase P1, bearing in mind that phase signal U1 is to be evaluated in order to determine the position of the rotor.

Figure 5:
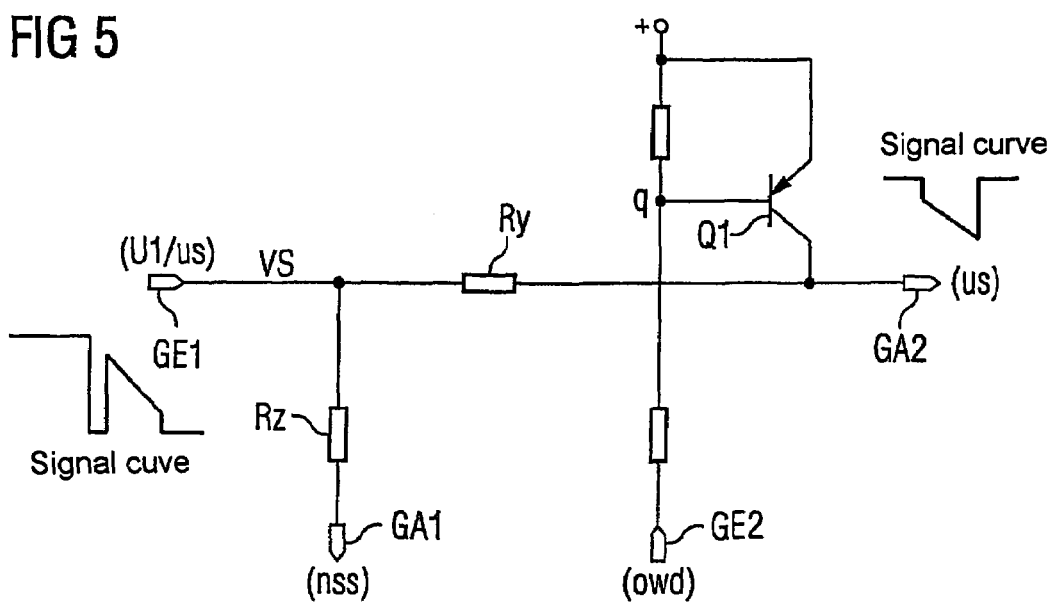

FIG. 5 shows a typical embodiment of a gate generator, which may be a further component of a signal conditioning unit 4C. The gate generator consists mainly of a gate-switching element Q1 which connects a positive potential of a DC voltage source (not shown) to a signal line VS. The gate generator has two signal inputs GE1 and GE2 as well as two signal outputs GA1 and GA2.

A phase signal U1 of the signal phase P1, in the form of the evaluation signal us at the signal input GE1, can be fed into the signal line VS of the gate generator, either directly or after prior conditioning by for example a HDV unit according to FIG. 4. The gate generator is used for further conditioning of the phase signal U1 or evaluation signal us used for determining position.

On signal input GE2, which is connected to the control gate q of the gate-switching element Q1, is an open-window control signal, also referred to below as an owd signal, by which the gate-switching element Q1 is actuated.

First, on the signal line VS carrying the evaluation signal us, a signal known as a no-load signal nss is decoupled to the signal output GA1 via a decoupling resistor Rz. This no-load signal nss is used to initialize the owd signal owd in an external signal generator not shown in FIG. 5.

Located in the signal line VS, before the connection point of the gate-switching element Q1, is a second decoupling resistor Ry. With the aid of the gate-switching element Q1, the positive potential of a DC voltage source is switched to the signal line VS, under the control of the owd signal owd. The owd signal locks the gate-switching element Q1 for so long as a valid induction signal is to be awaited on the phase connection V1 of the signal phase P1. This is the case as soon as the signal phase P1 is switched to potential-free and no further free-running current can flow in this phase. Outside of this region the gate-switching element Q1 is through-connected due to the owd signal, and the signal line VS is switched to the positive potential of the DC voltage source. In this way, only that region of the total course of the evaluation signal us that is relevant to determining the position is provided at the signal output GA2 for further evaluation within the period of observation.

Figure 6:
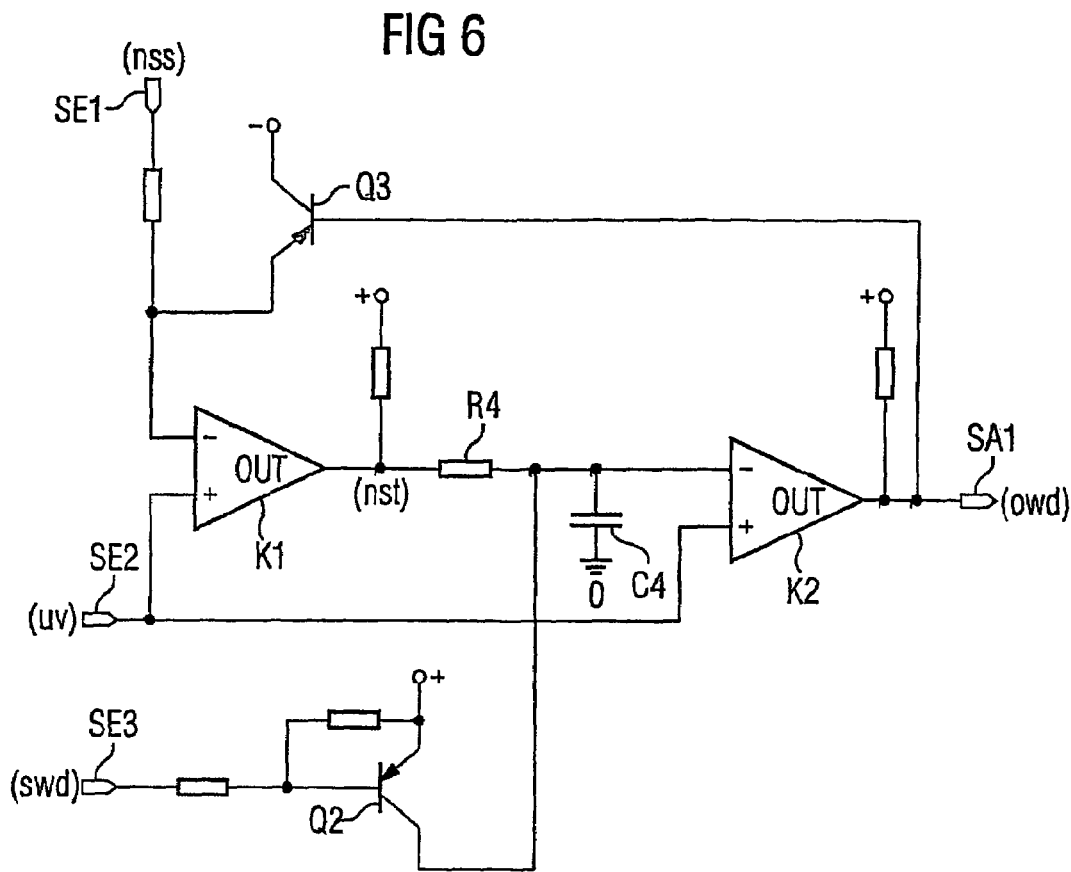

FIG. 6 shows a circuit arrangement of a signal generator which serves to provide an open-window control signal, known as an owd signal, which defines the period of observation for the evaluation signal us. The signal generator has three signal inputs SE1, SE2 and SE3 as well as a signal output SA1. The circuit arrangement consists mainly of two comparator components K1 and K2, and two switching elements Q2 and Q3.

The owd signal owd, dependent upon a no-load signal nss at the signal input SE1, an offset comparison signal uv at the signal input SE2 and a state-window signal swd, from here on also known as the swd signal, is generated at the signal input SE3 and provided at the signal output SA1 of the signal generator. The free-running current of the signal phase P1 is evaluated with the aid of the circuit shown, and dependent upon this the owd signal is generated, said owd signal being dynamically adapted to the duration of the free-running current.

The comparator component K1 compares the no-load signal nss on the signal input SE1 with the permanently specified, constant offset comparison signal uv. The offset comparison signal uv can be provided by the control DC voltage source via a simple voltage divider, not shown in FIG. 6. The output signal nst of the comparator component K1, also referred to below as the nst signal, is positive so long as a free-running current is flowing in the signal phase. The nst signal is smoothed by a R/C element consisting of the resistor R4 and the capacitor C4. For the no-load signal nss and the swd signal swd, the latter of which is fed in via the signal input SE3 and applied to the nst signal by means of the switching element Q2, the simultaneous decoupling by means of the resistor R4 results in an AND operation. The downstream comparator component K2 compares the signal of this AND operation with the constant offset comparison signal uv and delivers to its output the desired owd signal owd which defines the period of observation for the evaluation signal us.

Thus as soon as a valid induction signal is to be awaited within the status period specified via the swd signal swd, the owd signal is positive. The swd signal can be predetermined by the main control unit 4. By feeding the owd signal back via the switching element Q3 to the signal input SE1 of the comparator K1, the owd signal is set and held stable when the first positive signal edge occurs at the signal output SA1. This prevents interference in the no-load signal nss from prematurely deleting the owd signal. Resetting the swd signal also causes the owd signal to be reset.

Figure 7:
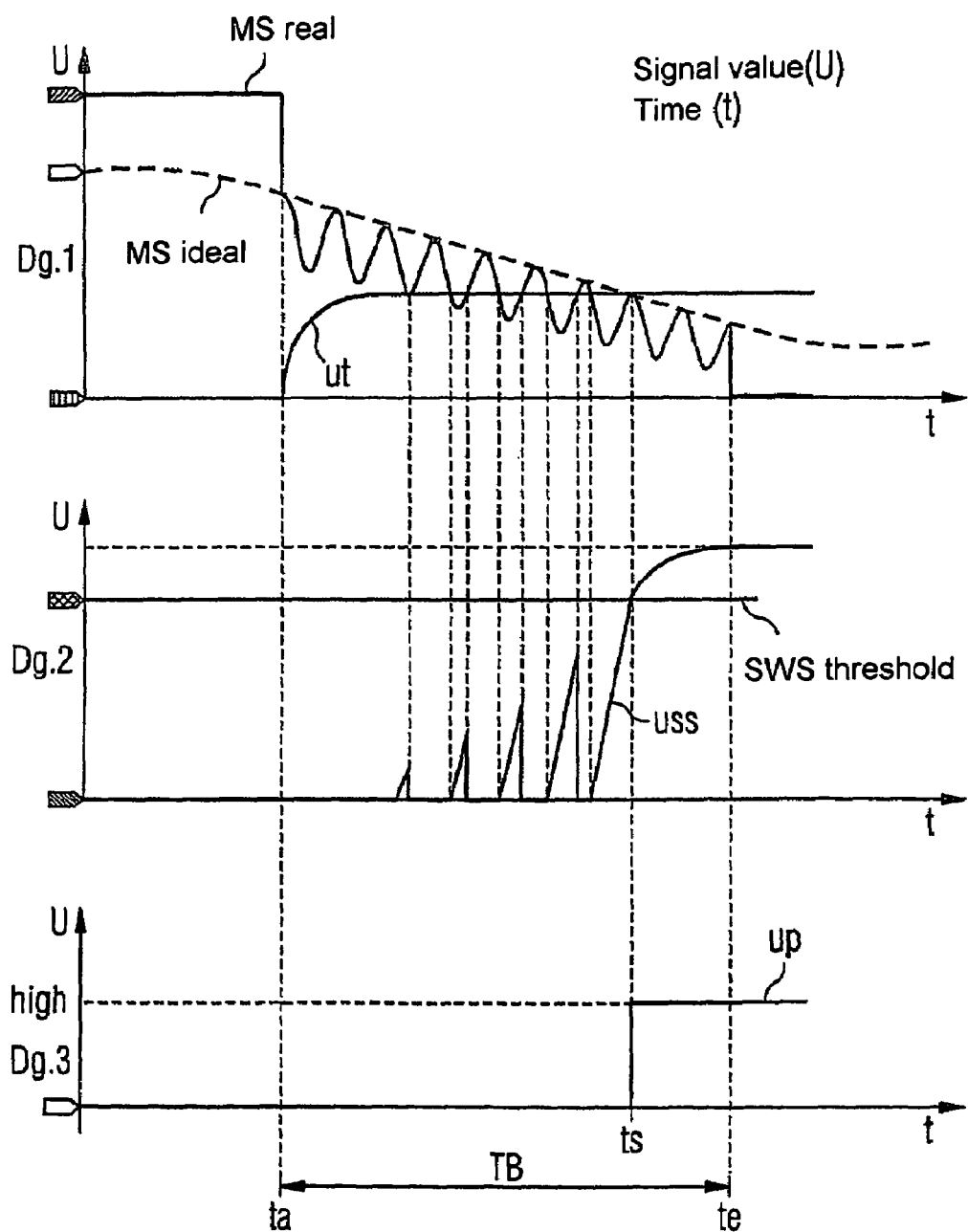

The circuit arrangement for a position detector with digital filters, shown as a diagram in FIG. 7A, consists mainly of a comparator component K3 and a threshold switch SWS as well as a capacitor C3. Signals and control signals for evaluation are fed into the position detector via the three signal inputs PE1, PE2 and PE3, and then processed to a position signal up, present on the signal output PA1. The time-related curve of the individual signals is shown in the three diagrams Dg.1, Dg.2 and Dg.3 of FIG. 7B.

The position signal up is generated by comparison of the evaluation signal us with a threshold signal ut. For this purpose the comparator component K3 compares the evaluation signal us with the threshold signal ut and delivers a positive output signal as soon as the value drops below that of the threshold signal ut. The higher the threshold signal ut on the signal input PE3, the sooner the evaluation signal will drop below it.

Initially, due to the residual interference superimposed on the evaluation signal us, only transient signal jumps with lengthening on periods can be seen at the output from the comparator component K3. As a result, the superimposed interfering oscillations at first fall only briefly below the value of the threshold signal ut.

A downstream R/C element, consisting of a resistor R3 and the capacitor C3, generates from the signal jumps a switching signal uss having signal peaks with a voltage value which is proportional to the on period. This pulsed switching signal uss is fed into a downstream threshold switch SWS having a defined switching threshold, such as a Schmitt trigger. Once the evaluation signal us falls constantly below the value of the threshold signal ut for a sufficiently long time, the switching signal uss increases to a value which exceeds the internal threshold of the downstream threshold switch SWS. As soon as this switching threshold is exceeded, the position signal up is set at the signal output PA1 of the threshold switch SWS, that is, the signal is raised to high potential. The rising edge of the position signal up thus corresponds to a particular position of the rotor. Commutation of the motor phases takes place as a function of this position signal up. By this means the R/C element R3/C3 interacts with the threshold switch SWS to form a digital bounce filter.

The diagram Dg.1 of FIG. 7B shows the curves of the signal values (U) of the evaluation signal us-real overlaid with interfering oscillations, and the threshold signal ut. The broken line shows an idealized evaluation signal us-ideal, at whose theoretical intercept point with the threshold signal the position signal up is set, that is, digitally raised to high potential. This is illustrated in diagram Dg.3. With the aid of the circuit shown in FIG. 7A, therefore, the switching instant for the position signal up is virtually based on an idealized curve of the evaluation signal us-ideal. The threshold signal ut is only raised steadily to its preset value at the instant ta at which the signal phase P1 is switched to potential-free, being the instant which represents the beginning of the period of observation TB. The instant te represents the end of the period of observation within which signal comparison takes place. At the instant ts the idealized evaluation signal us-ideal falls below the threshold signal ut and the position signal up is set.

The diagram Dg.2 shows the curve of the switching signal uss together with the threshold of the threshold switch SWS. If the evaluation signal us-real falls below the threshold signal ut, the switching signal uss, delayed by the R/C element R3/C3, starts to rise, then falls away again as soon as the evaluation signal us-real rises above the value of the threshold signal once more. When but not until the evaluation signal us-real stays below the threshold signal ut for long enough, the switching signal uss reaches the threshold of the threshold switch, which then sets the position signal up, that is, it sharply raises the said signal to high potential.

The instant at which the position signal up is set thus depends on the value of the threshold signal ut and the filter time constant of the R/C element R3/C3. Ideally the filter time constant is matched precisely to the frequency of the pulse-width modulation for the power control. In the event of varying pulse width this can also be done dynamically.

Figure 8:
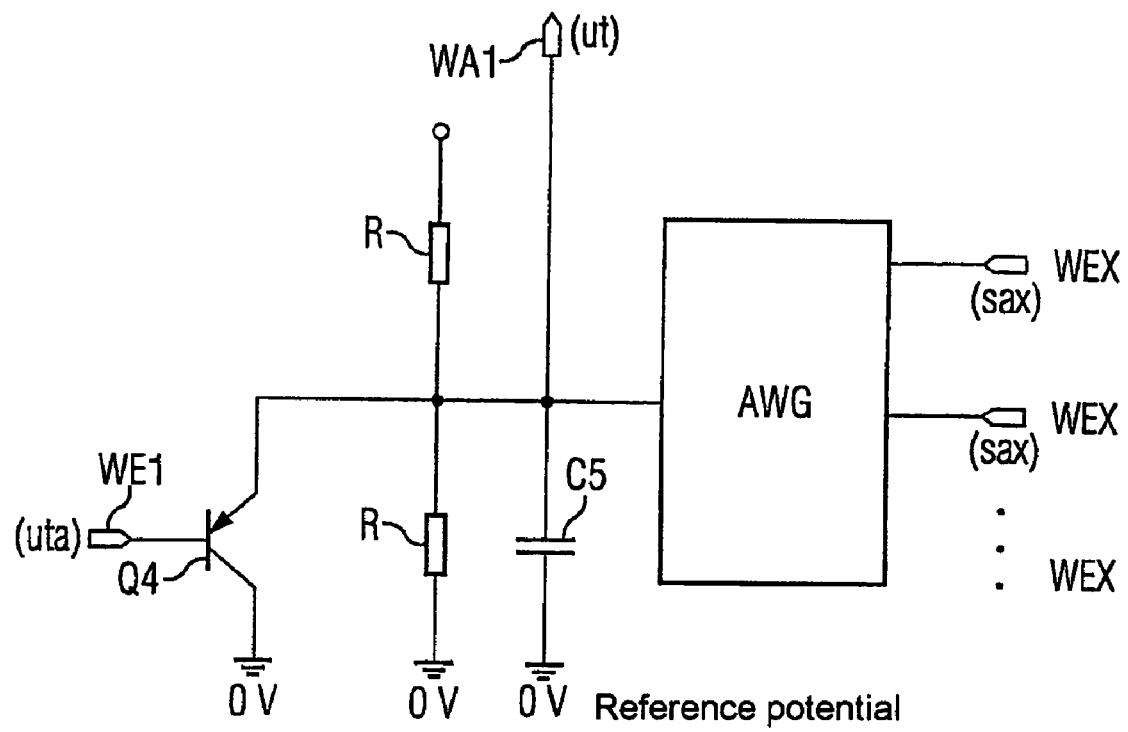

FIG. 8 shows a threshold generator that provides a threshold signal ut which is variable in value on a signal output WA1. To this end the threshold generator has an analog value generator AWG and a switching element Q4 as well as a signal input WE1 and a plurality of signal inputs WEX.

Request signals are fed into the analog value generator via the signal inputs WEX. The analog value generator AWG generates an analog signal from these request signals sax. The digital request signals sax are fed in by a central control unit for example, and converted into an analog signal which represents the value of the threshold signal ut.

With the aid of the switching element Q4 the analog output from the analog value generator AWG can be switched to the 0V reference potential of a DC voltage source in accordance with a threshold activation signal uta, from here on also called a uta signal. As soon as the uta signal is set to high potential, the switching element Q4 locks and the value of the threshold signal ut increases, delayed by the capacitor C5, to the limit value defined via the request signals sax. The time constant by which the threshold signal ut increases is defined by the combination and dimensioning of resistors and the capacitor C5. The request signals sax and thereby the value of the threshold signal ut can be predefined by a main control unit dynamically adapted to the current rotor speed.

An open-window control signal owd of the kind generated by a signal generator such as that shown in FIG. 6 can be used as the threshold activation signal uta. In this case the threshold signal ut is activated at precisely the instant when the period of observation for the evaluation signal us begins, said instant being likewise defined by the open-window control signal owd.

In order to condition the phase signal of the signal phase P1 and generate the position signal up, the components shown in FIGS. 3 to 8 can be wholly or partly combined with one another and brought together in a signal conditioning unit 4C as shown in FIG. 1. When combined in this way the individual components and their respective signals interact and are interdependent.

Figure 9:
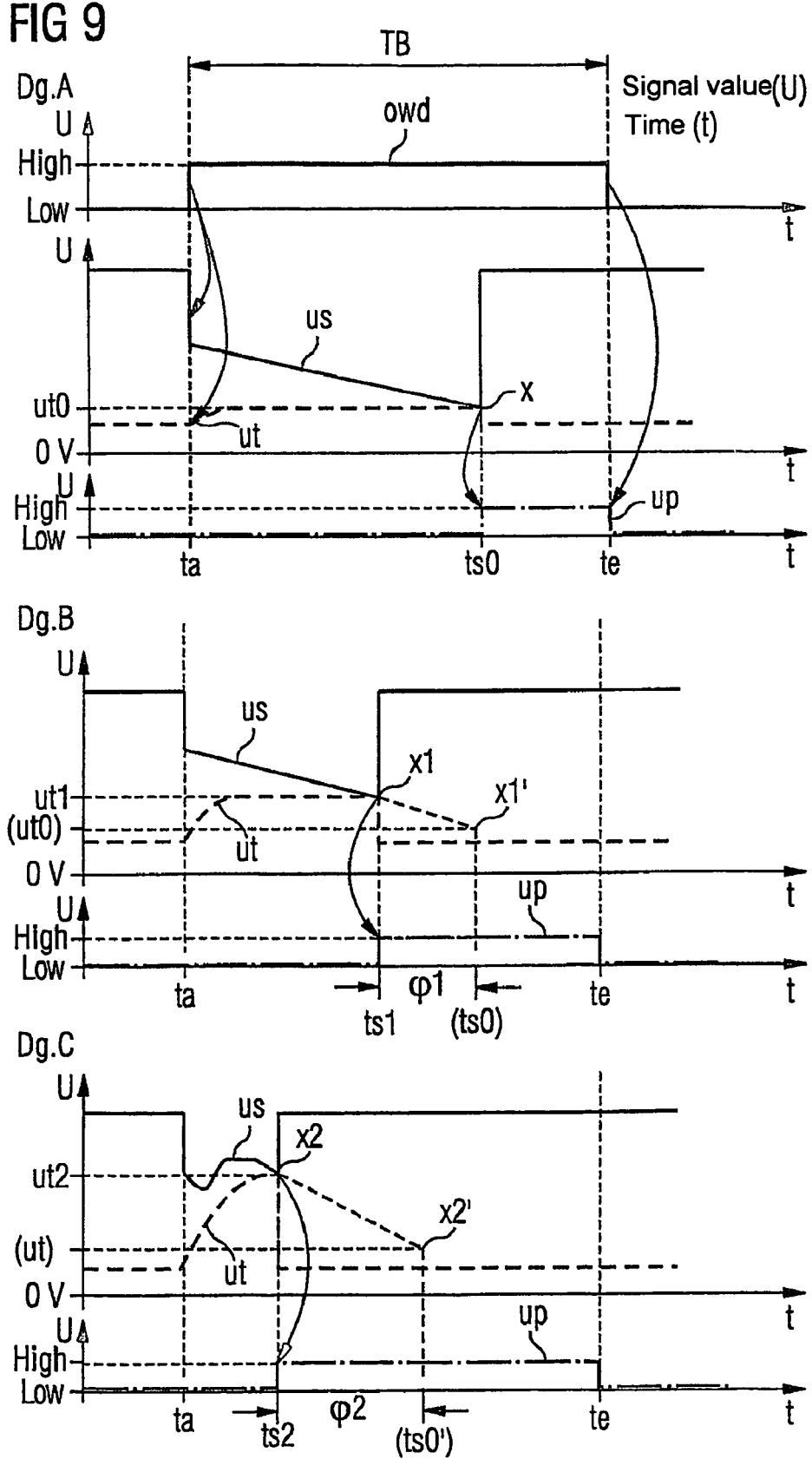

The curves of the signals that are important for determining the rotor position, shown in FIG. 9, are an evaluation signal us, an open-window control signal owd, a threshold signal ut and a position signal up generated therefrom. These are shown in the signal diagrams Dg.A, Dg.B and Dg.C in FIG. 9 with the signal value U over the time-related curve t. The three diagrams in FIG. 9 show the signal value curves for a varied sequence of diagrams at increasing rotor speeds.

The upper part of diagram Dg.A shows the curve of the owd signal owd that defines the period of observation TB for the evaluation signal us. The period of observation begins at the instant ta when the owd signal changes to high potential.

The central part of diagram Dg.A shows the curve of the evaluation signal us together with the threshold signal ut. In this the evaluation signal is idealized and shown without superimposed interference. Beginning at the instant ta, the curve of the signal induced in a signal phase is mapped by the evaluation signal us within the period of observation TB. At the same time, initialized by the owd signal owd, the value of the threshold signal ut starts at the instant ta to increase to its preset value ut0. This value ut0 of the threshold signal ut is preset in relation to the current rotor speed, for example by means of a main control unit and a threshold generator. Diagram Dg.A shows the signal curves at the initial rotor speed V0. The threshold signal ut0 has a superimposed offset value and is thus already above the 0V potential before the instant ta. The increase in the threshold signal ut0 takes place for example in accordance with the time constant defined in an associated R/C element of a threshold generator. The intercept point X between the evaluation signal us and the threshold signal ut0 is found before expiration of the period of observation TB at the instant ts0. Initialized by this intercept point X, at said instant ts0 the position signal up changes from its previous low potential to high potential, as shown in the lower part of diagram Dg.A. The subsequent instant at which the motor phases are commutated is dependent on this change in the signal. At the end of the period of observation the owd signal is reset to low potential at the instant te. As a consequence of this the position signal up is also reset to low potential. The position signal up is set again in the subsequent commutation cycle.

To increase the speed of the rotor the instant of commutation relative to the rotor position is brought forward in time, progressively advancing the commutation. The rotating magnetic field moves ahead of the rotating rotor by a certain angle of rotation. This angle is known as the angle of advance $\phi$. The rotor is dragged by the advancing magnetic field and is thereby accelerated. The angle of advance $\phi$ can be set by increasing the value of the threshold signal ut. This is illustrated in diagram Dg.B of FIG. 9.

When the period of observation TB starts at instant ta, the threshold signal ut rises to a value ut1 which is higher than the value ut0. This causes the evaluation signal us to intersect the threshold signal ut at intercept point X1 at instant ts1 and thus earlier than when ut=ut0, for which reason the position signal up, triggered by the commutation, is also set earlier. The time span between the instants ts1 and ts0 represents the angle of advance $\phi1$.

A further increase in rotor speed and the corresponding threshold signal is illustrated in diagram Dg.C of FIG. 9. It is noticeable that due to the higher rotation speed of the rotor, the theoretical intercept point X2' of the evaluation signal us, the original threshold signal of which is ut=ut0, is also brought forward in time to an earlier instant ts0'. The threshold signal ut is set at an increased value ut=ut2, generating a further increase in the angle of advance $\phi2$.

Due to the very large angle of advance, the voltage induced in the signal phase becomes greater than the existing battery voltage of a motor DC voltage source. A freewheeling diode of an associated power-switch element therefore becomes conducting once more, resulting in an overshooting curve for the evaluation signal us at the start of the period of observation TB.

In this case a steady, delayed rise in the threshold signal ut to its preset value ut2 avoids causing an earlier intercept point of the overshooting evaluation signal us with the threshold signal ut, so preventing a mistimed commutation.

Further voltage rises in the induction signal of the signal phase cause enlargement of the plateau-shaped region in the curve of the evaluation signal us that characterizes the region in which the free-wheeling diode becomes conducting. The declining curve of the evaluation signal is therefore moved back in time, as is the intercept point X2, and the angle of advance φ2 is automatically reduced. This has a stabilizing effect and results in a pronounced insensitivity to sudden increments in loading, interference or control commands.

The above-mentioned individual circuit arrangements for the capacitive interference suppression component, as well as the half-wave differential amplifier unit with filter function, the gate generator, the signal generator, the position detector with digital filter and the threshold generator, can be selectively or totally combined in various ways in a separately constructed circuit unit for induction signal processing. In the same way the individual steps in the methods or sub-methods that can be executed with the circuit arrangements described above can also be executed in a control unit with the aid of similarly constructed circuit arrangements or even computer algorithms. To this end the control unit can contain one or more microprocessors.

Figure 10:
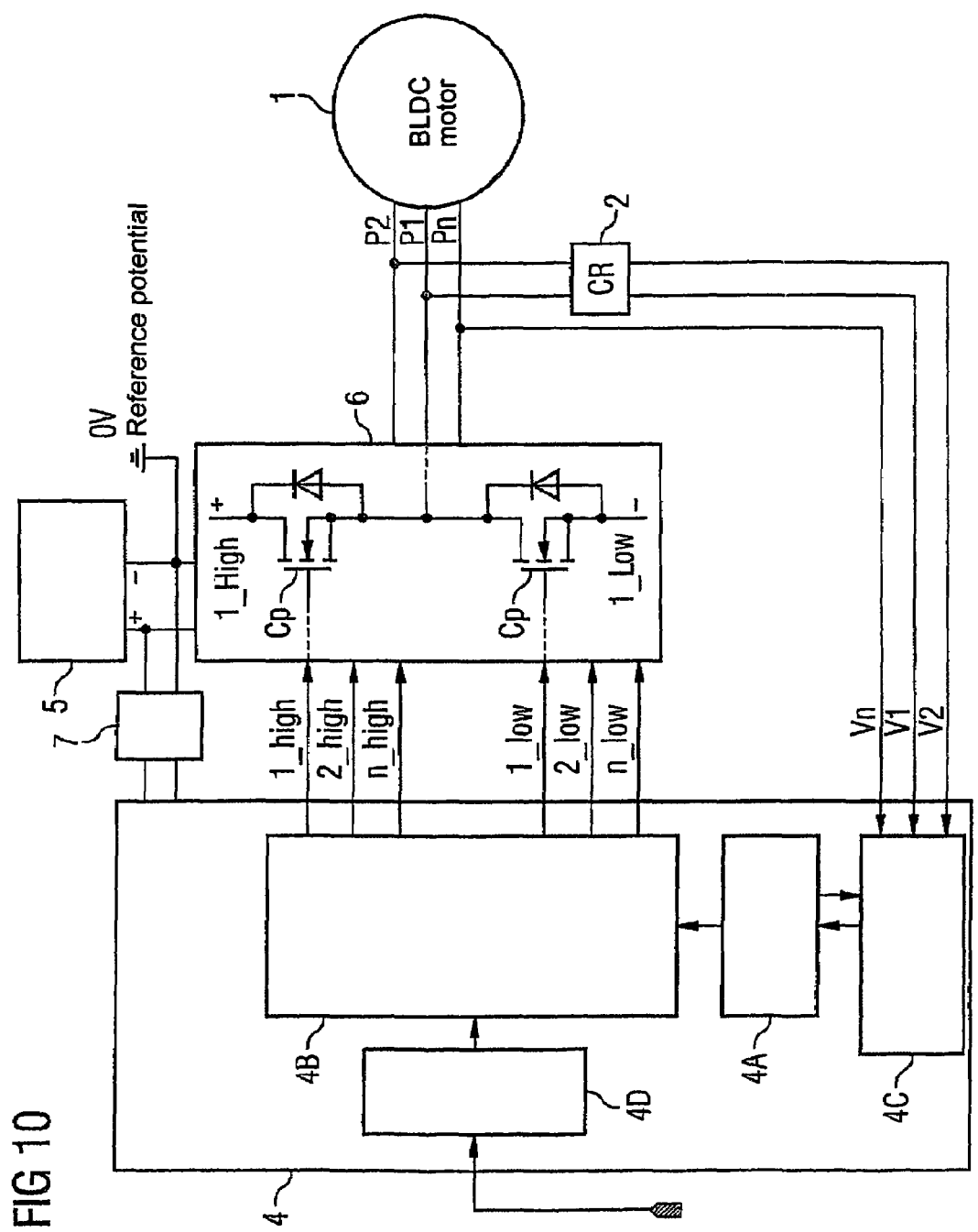

FIG. 10 shows the overall arrangement of a control unit for a BLDC motor 1 without a separately constructed circuit arrangement for conditioning a phase signal. Here the necessary functions for conditioning, amplifying, filtering and evaluating the phase signal, and the generation of a position signal for feeding into further function components, are directly executed by a central main control unit 4. The block diagram in FIG. 10 shows the individual function components of the main control unit 4. These are a position processing module 4A, a commutation module 4B, a signal processing module 4C and a pulse width generator 4D. The only power supply provided for the BLDC motor 1, the main control unit and a power control unit is a shared DC voltage source 5. If it is necessary to adapt the voltage level to special requirements of the main control unit, this is done with the aid of a voltage regulator 7 or a unit which operates in a similar way such as a voltage converter or voltage stabilizer. A capacitive interference suppression component 2 (CR) is as mentioned constructed with separate circuit elements and arranged between two motor phases.

The invention claimed is:

1. A circuit arrangement for controlling a brushless, permanently excited direct current motor, the motor having a rotor, a stator and a plurality of phases having in each case an external phase connection, the arrangement comprising:
    a power control unit to which the phases, a power DC voltage source and a main control unit are connected, such that the main control unit, which is also electrically connected to the phase connections, controls the power control unit in accordance with an electrical induction signal from only one of the phases, being the signal phase, induced by the rotation of the rotor, in such a way that the phases dependent on the relative rotational position of the rotor are electrically connected in cyclic sequence, and offset in time, for one commutation interval in each case, alternating between a higher or lower voltage potential of the motor DC voltage source or are electrically separated from both voltage potentials, and
    such that immediately between the external phase connection of the signal phase and the external phase connection, and only between these two phase connections, a capacitive interference suppression component is arranged and acts as part of a bridge circuit comprising:
        a) both phases arranged adjacent to the signal phase,
        b) a spurious total capacitance of the electronic components of the power control assigned to the signal phase,
        c) the signal phase arranged to form the measuring bridge, and
        d) the interference suppression component dimensioned such that the bridge circuit is balanced.

2. The circuit arrangement according to claim 1, further comprising a pulse width generator arranged to provides pulse-width modulated control signals for use in making the electrical connection between the phases and the higher or lower potential of the power DC voltage source during the commutation interval with pulse-width modulation in a variable pulse-width ratio.

3. The circuit arrangement according to claim 1, further comprising a half-wave differential amplifier unit with filter function, connected input-side to the phase connections of the signal phase and both adjacent phase in the electrical cycle, and having an output-side signal line, on which an evaluation signal is present, which is proportional to the induction signal of the signal phase.

4. The circuit arrangement according to claim 1, further comprising:
    a gate generator which is connected to the signal phase or to a signal line on which the induction signal or the evaluation signal is present, and
    wherein the generator is arranged to serve to mask the induction signal or the evaluation signal in accordance with an open-window control signal and defining a period of observation in the electrical cycle in which the evaluation signal can be measured.

5. The circuit arrangement according to claim 4, further comprising a signal generator for the open-window control signal, the signal generator being connected in an input-side to the signal line on which the evaluation signal is present, and to the main control unit, and wherein by means of which the open-window control signal, in accordance with a no-load signal which is proportional to the evaluation signal present on the signal line, and also by means of a state-window signal generated by the control unit, is set, the minimum duration of the period of observation being predefined by the state-window signal from the control unit.

6. The circuit arrangement according to claim 1, further comprising a position detector for generating a position signal, the position detector being arranged to be connected in an input-side to the signal phase or the signal line on which the induction signal or the evaluation signal is present, and to at least one further signal line on which a threshold signal is present, wherein the position signal that is present on the signal output of the position detector is dependent on the comparison of the induction signal or the evaluation signal with the predetermined threshold signal.

7. The circuit arrangement according to claim 4, further comprising:
    a threshold generator
    connected in an input-side to the main control unit and output-side to the position detector, and
    said threshold generator arranged to only raise the threshold signal at the start of the period of observation, depending on request signals from the control unit and an activation signal.

8. A method for controlling a brushless, permanently excited direct current motor having a circuit arrangement for controlling a brushless, permanently excited direct current motor, the motor having a rotor, a stator and a plurality of phases having each case an external phase connection, the method comprising the steps of:
    electrically connecting phases dependent on relative rotational position of a rotor in cyclic sequence and offset in time, for a commutation interval in each case, alternating between a higher or lower voltage potential of a power DC voltage source or being electrically separated from both potentials, determining a relative rotational position of the rotor only with an aid of the induction signal which is present on the signal phase, and arranging an electrically capacitive interference suppression component to act as part of a bridge circuit, comprising:
   a) both phases adjacent to the signal phase,
   b) a spurious total capacitance of the electronic components of the power control assigned to the signal phase, and
   c) the signal phase which forms the measuring bridge, and the interference suppression component is dimensioned such that the bridge circuit is balanced and such that the interfering influences on the induction signal caused by the electronic switches of the signal phase, are compensated for by the interference suppression component.

9. The method according to claim 8, wherein the electrical connection between the phases and the higher or lower potential of the power DC voltage source is made during the commutation interval with pulse-width modulation in a variable pulse-width ratio.

10. The method according to claim 8, wherein the induction signals of the signal phase and the two adjacent phases in the electrical cycle are linked together by circuitry or by a computer program in the control unit in such a way that high-frequency interfering influences superimposed on the induction signal are filtered out, resulting in an evaluation signal expressed by the relationship $$us = \left(\frac{n-1}{n}\right) \cdot U1 - \frac{1}{n} \cdot \sum_{\omega=1}^{n} U_\omega$$

wherein said signal being referenced to the 0V potential of a circuit DC voltage source is used to supply electrical power to the circuit arrangement, where n represents the number of phases and $U_\omega$ the induction signal on the phase concerned.

11. The method according to claim 8, wherein the induction signal of the signal phase or the evaluation signal, in accordance with an open-window control signal is overlaid with a potential of the circuit DC voltage source, for which reason a period of observation is defined in relation to time, in the region of which the induction signal, the signal phase or the evaluation signal can be measured.

12. The method according to claim 11, wherein the open-window control signal, in accordance with a no-load signal which is proportional to the induction signal of the signal phase or to the evaluation signal, and also by means of a state-window signal generated by the control unit, is set, the minimum duration for which the open-window control signal remains set being predefined by the state-window signal from the control unit.

13. The method according to claim 1, wherein the position signal results from comparison of the induction signal of the signal phase or the evaluation signal with a predefined threshold within the period of observation and a switching signal is generated only when the value drops below the threshold for a predefined interval, the value of said switching signal exceeding the response threshold of a switching element for which reason the position signal is generated at its output.

14. The method according to claim 13, wherein the desired value of the threshold is adjustable within a range, dependent on control signals of the control unit, and the induction signal or the evaluation signal falls below the threshold within the period of observation in the electrical cycle sooner in the case of a higher threshold and later in the case of a lower threshold.

15. The method according to claim 13, wherein the threshold is raised with delay to its desired value only at the start of the period of observation, depending on an activation signal, thus preventing a premature fall below the threshold.

16. The method according to claim 15, wherein the open-window control signal is used as an activation signal.

* * * * *